(12) United States Patent
Lin

(10) Patent No.: US 11,136,225 B1
(45) Date of Patent: Oct. 5, 2021

(54) MONITORING AND MEASURING APPARATUSES ABLE TO DISPLAY ACTUAL DEFLECTION ANGLE OF LIFTING-HOOK, AND CRANE

(71) Applicant: Handing Lin, Fujian (CN)

(72) Inventor: Handing Lin, Fujian (CN)

( * ) Notice: Subject to any disclaimer, the term of this patent is extended or adjusted under 35 U.S.C. 154(b) by 0 days.

(21) Appl. No.: 17/059,969

(22) PCT Filed: Aug. 3, 2020

(86) PCT No.: PCT/CN2020/106574
§ 371 (c)(1),
(2) Date: Nov. 30, 2020

(87) PCT Pub. No.: WO2020/228866
PCT Pub. Date: Nov. 19, 2020

(30) Foreign Application Priority Data

Apr. 16, 2020 (CN) .......................... 202010302204.6
Jul. 1, 2020 (CN) .......................... 202010615863.5

(51) Int. Cl.
*B66C 1/40* (2006.01)
*G01B 21/22* (2006.01)

(52) U.S. Cl.
CPC ................ *B66C 1/40* (2013.01); *G01B 21/22* (2013.01); *B60Y 2200/416* (2013.01)

(58) Field of Classification Search
CPC .................................. B66C 1/40; G01B 21/22
USPC ........................................................ 270/212
See application file for complete search history.

(56) References Cited

U.S. PATENT DOCUMENTS

| | | | |
|---|---|---|---|
| 2009/0008351 A1* | 1/2009 | Schneider | ............... B66C 13/46 212/272 |
| 2015/0217976 A1* | 8/2015 | Tanizumi | ................ G06F 17/10 703/2 |
| 2015/0344272 A1* | 12/2015 | Lin | ........................ G01G 19/14 212/276 |
| 2018/0009640 A1* | 1/2018 | Lin | .................... H04N 5/23296 |

* cited by examiner

*Primary Examiner* — Aditya S Bhat

(57) ABSTRACT

A monitoring detection device and crane for displaying real-time hook bias angle, characterized in that a fixed pulley assembly a1 of a crane is hung on a lifting lug b2 of a crane boom b1 by a shackle a5 through a connector a3.
the connector a3 is connected to the fixed pulley assembly a1 through a articulated shaft a2 which is arranged in a direction perpendicular to the axis of a fixed pulley; a platform surface perpendicular to a pulley block force application line or a line parallel to the pulley block force application line is arranged on the connector to be used to. Beneficial effects: the real-time hook bias angle can be accurately displayed when the crane is lifting: Beneficial effects: the real-time hook bias angle can be accurately displayed when the crane is lifting.

9 Claims, 4 Drawing Sheets

MONITORING AND MEASURING APPARATUSES ABLE TO DISPLAY ACTUAL DEFLECTION ANGLE OF LIFTING-HOOK, AND CRANE

CROSS REFERENCE TO RELATED APPLICATIONS

This application is the national phase entry of International Application No. PCT/CN2020/106574, filed on Nov. 30, 2020, which is based upon and claims priority to Chinese Application No. CN 2020106158635, filed on Jul. 1, 2020, and Chinese Application No. CN 2020103022046, filed on Apr. 16, 2020, the entire contents of which are incorporated herein by reference.

BACKGROUND OF THE INVENTION

1. Technical Field

A real-time hook bias angle monitoring and detection device and a crane belong to the technical field of cranes. To be precise, it is a crane equipped with a real-time hook bias angle monitoring and detection device.

2. Description of Related Art

According to SH/3515-2003 Construction Standard for Large-size Equipment Hoisting Engineering 9.1.4, the hoisting process of cranes shall follow "During hoisting, the hook bias angle should be less than 3°". As specified in Technical Specification for Construction of Large-size Equipment Hoisting Engineering in Petrochemical Industry 11.1.4, "During hoisting, the hook bias angle should be less than 1°".

According to investigations, crane appeared in the United States in 1883, and a thousand-ton crane that can be used for off-road high-speed roads has been developed. However, the crane as a hoisting process equipment has relatively slow development in hoisting. So far, the crane driver cannot know whether the crane pulley block is in the hoisting The vertical state, especially in large-scale hoisting, should be grasped by the naked eye and years of experience of the hoisting commander, and the crane driver should adjust the vertical state of the pulley block to complete the hoisting operation. When the hoisted heavy object is lifted in the center, the instrument can assist in monitoring. But it is not used in dynamic hoisting, so it can be determined that the crane lacks a real-time hook bias monitoring device.

Due to the fact that the crane performs hoisting by means of the pulley block, a detector is often installed on the pulley block to detect the bias angle of the lifting hook of the crane, that is, the detector needs to be installed on the pulley block, which is constituted by a fixed pulley A1 and a movable pulley A2 which are fixed on a crane jib A5, a steel wire rope A3 wound across the fixed pulley A1 and the movable pulley A2, and a lifting hook A4, to detect the bias angle of the lifting hook of the crane.

In most cases, the bias angle of the lifting hook of the crane is detected by detecting the swing angle of a lifting rope (the steel wire rope of the lifting hook) by the detector installed on the pulley block or is detected by a camera installed on the fixed pulley of the pulley block based on the visual technology. The swing angle of the lifting rope is detected through the following scheme: one of multiple lifting ropes across the pulley block is selected to serve as a detection object, it can be observed, in the hoisting process, that even if the steel wire ropes are sequentially wound across the pulley block in the hoisting process, the steel wire ropes or lifting ropes are not in parallel, and there exists a relative deflection between the axis of the fixed pulley and the axis of the movable pulley because the axis of the fixed pulley is fixed on the crane jib while the direction of the axis of the movable pulley will change under the influence and constraint of the operating direction of the lifting hook and the hoisted weight. The camera-based visual technology may be restricted by various factors such as the sight, the light and the ambient environment and carries out detection mainly by searching for mark points on a lifting hook, so that similar to the detection of the lifting rope, accurate detection of the bias angle of the lifting hook cannot be realized due to the relative bias between the axis of the fixed pulley and the axis of the movable pulley, and thus, the requirement for the detection accuracy of a deviation angle of a pulley block force application line from a vertical line of a mobile crane cannot be met.

Different from the approach of detecting the bias angle of the lifting hook by means of the lifting rope or the camera visual technology, the applicant puts forwards Patent Application No. 201610733240.1 and Patent Application No. 201610629162.0, which failed to gain any attention, based on the study of detecting the bias angle of the lifting hook of the crane by a detector installed on the pulley block. So far, the several most famous crane manufacturers and research institutes in China still monitor the bias angle of the lifting hook by detecting the swing angle of the lifting rope.

BRIEF SUMMARY OF THE INVENTION

The object of the present invention is to provide a real-time book bias angle monitoring and detection device. Another object is to provide a mobile crane equipped with a real-time hook bias angle monitoring and detection device. Angle monitoring and detection device can also be used for other cranes that require precise detection of hook bias angles.

The present application deviates from installing a detector on the pulley block to detect the bias angle of the hook, but installs a detector on the connecting piece defined between the fixed pulley of the pulley block and the boom to detect the Pulley force (resultant force, the same below) hook bias angle deviated from the vertical line angle.

A monitoring device for displaying real-time hook bias angle, which is characterized in,
Hang the fixed pulley assembly of the crane on the lifting lug of the crane boom via the connecting piece with shackles, Use a articulated shaft to connect the fixed pulley assembly at the other end of the connecting piece, and set the articulated shaft in an orientation perpendicular the fixed pulley axis;
a platform surface perpendicular to a pulley block force application line or a line parallel to the pulley block force application line is arranged on the connector to be used to; in the hoisting process, the value of a real-time included angle between the platform surface perpendicular to the pulley block force application line and a horizontal plane or a real-time deviation angle of the line parallel to the pulley block force application line from a vertical line is equal to the value of the real-time bias angle of the lifting hook. Need to explain: It is to install lifting lugs on the original crane jib or weighing jib, jib, etc., where the fixed pulley is installed.

The display real-time hook bias angle monitoring device is characterized in that the hook bias angle detection is wherein a real-time included angle between the platform surface a6 perpendicular to the pulley block force application line and the horizontal plane is detected to detect the bias angle of the lifting hook in the hoisting process; and when an angle measuring instrument a7 is installed on the platform surface a6, a real-time X-axis component and a real-time Y-axis component are detected and are then synthesized to obtain the real-time bias angle of the lifting hook. performed by detecting the angle between the platform surface a6 and the horizontal plane perpendicular to the line of action of the pulley block force in real time when hoisting. An angle measuring instrument a7 is installed on the surface a6, and the real-time component along the X and Y axis is detected, and the combined value is equal to the real-time hook bias angle.

The display real-time hook bias angle monitoring device is characterized in of is characterized in that a deviation direction of the pulley block force application line from the vertical line is perpendicular to an intersection line of the platform surface a6 and the horizontal plane, and the real-time deviation angle of the pulley block force application line from the vertical line is located on the same plane as the real-time included angle between the platform surface a6 perpendicular to the pulley block force application line and the horizontal plane.

The display real-time hook bias angle monitoring device is characterized in that the object to be hoisted is centered (hook bias angle 0°) according to the displayed real-time hook bias angle; The bias angle of the hook of the crane monitoring the hoisting process is less than the specified value.

A detecting device for displaying the real-time bias angle of a lifting hook is characterized in that a fixed pulley assembly a1 of a crane is hung on a lifting lug b2 of a crane jib b1 by a shackle a5 through a connector a3; the connector a3 is connected to the fixed pulley assembly a1 through a articulated shaft a2 which is arranged in a direction perpendicular to the axis of a fixed pulley; a platform surface perpendicular to a pulley block force application line or a line parallel to the pulley block force application line is arranged on the connector to be used to.

A mobile crane displaying real-time hook bias angle, which is characterized in that it includes any of the above-mentioned display real-time hook bias angle monitoring device, or includes the above-mentioned display real-time hook bias angle detection device.

FIG. 2, the fixed pulley assembly a1 of the crane is hung on the lifting lug b2 of the crane jib b1 through the connector a3, one end of the connector a3 is connected to the fixed pulley assembly a1 through the articulated shaft a2 which is arranged in a direction perpendicular to the axis of the fixed pulley, and the other end of the connector a3 is hung on the lifting lug b2 of the crane jib through a shackle a5. In this way, when a pulley block force application point on the axis of the fixed pulley deviates, the fixed pulley assembly a1 will be automatically adjusted along the articulated shaft a2 under the effect of hoisting tension of the pulley block, at this moment, the axis of the fixed pulley inclines slightly. Because a pulley block force application line passes through the connector a3, when a platform with a platform surface a6 perpendicular to the pulley block force application line is fixedly installed on the connector a3, the pulley block force application line will be always perpendicular to the platform surface a6 in the hoisting process.

Because the pulley block force application line is always perpendicular to the platform surface in the hoisting process, when an angle measuring instrument is fixedly installed on the platform surface on the connector, the value of an included angle detected between the platform surface perpendicular to the pulley block force application line and the horizontal plane is equal to the value of the real-time bias angle of the lifting hook.

FIG. 4, suppose the intersection angle between point b on the line m of force acting through the pulley block and the vertical line n through point b is $\angle b$, The platform surface w (ie a6 in FIG. 2) perpendicular to the force action line m of the pulley group; the angle between the platform surface W and the horizontal plane Z is $\angle a$ From the point b in the dihedral angle, the vertical feet of the perpendicular line drawn to the W and Z planes are C and D respectively, and the point a Ca is perpendicular to the intersection line L of the W plane and the Z plane in the plane through the C point to connect Da $\therefore L \perp Ca$, $L \perp bC$, $\therefore L \perp$face $bCa$, $\therefore L \perp ba$, and $\therefore L \perp bD$, $\therefore L \perp$face $bDa$, $\therefore L \perp Da$, $\therefore \angle CaD$ is the plane angle of the dihedral angle, the quadrilateral aCbD is coplanar with the m,n straight line, and $\angle C = \angle D = 90°$ Therefore $\angle a$ (complementary to $\angle CbD$) is equal to the acute angle between them line and the n line $\angle b$ The above shows: that a deviation direction of the pulley block force application line from the vertical line is perpendicular to an intersection line of the platform surface a6 and the horizontal plane; and the real-time deviation angle of the pulley block force application line from the vertical line is located on the same plane as the real-time included angle between the platform surface a6 perpendicular to the pulley block force application line and the horizontal plane.

Therefore, an angle measuring instrument can be installed on the platform surface a6 to detect the real-time hook bias angle of the pulley block force line deviating from the vertical line angle.

Therefore, the defined connector a3 creates conditions for the correct detection of the hook bias angle (1) A platform surface perpendicular to the line of action of the pulley block is provided for the detection of the of the hook bias angle When the connector piece a3 is fixedly installed to satisfy the hook bias angle of 0°, the platform surface a6 is a horizontal platform, and the line of action of the pulley group force is always perpendicular to the platform surface a6 when lifting, Therefore, the platform surface a6 can be used to accurately detect the book bias angle.

(2) A straight line parallel to the line of action of the pulley block is provided for the detection of the hook bias angle A platform surface a6 perpendicular to the line of force of the pulley block is fixedly installed on the connector, and a straight line perpendicular to the platform surface a6 is fixed on the platform surface a6; Therefore, a detector can be installed on a straight line fixed perpendicular to the platform surface a6; accurately detect to hook.bias angle Vertical hoisting and hook bias angle monitoring in hoisting are the basic requirements for safe operation of cranes. For cranes with advanced equipment and flexible control and pilot-type handles, when the crane is added to display real-time hook bias angles, The crane driver can realize vertical hoisting (hook bias angle 0°) or monitor that the hook bias angle is the specified value during the hoisting.

The display real-time hook bias angle monitoring and detection device and the crane have beneficial effects: the present invention can display the accurate hook bias angle when hoisting, and can adjust the hoisted object to be lifted in the center according to the real-time hook bias angle; and The bias angle of the hook in the monitoring crane hoisting should be less than the value specified in the regulations; and the wired or wireless transmission including the bus can be selected, which is beneficial to the protection of the monitoring device and selects the power supply plan in combination with other devices on the crane; especially The precise detection of the hook bias angle can be realized on the mobile crane with advanced equipment and flexible operation, and the vertical hoisting monitoring function and the hook bias monitoring function during the hoisting can be added to the mobile crane.

DESCRIPTION OF THE DRAWINGS

The label in FIG. 1: A5 boom A1 fixed pulley A2 movable pulley A3 wire rope A4 hook

A scheme for displaying real-time hook bias angle when lifting

DETAILED DESCRIPTION OF THE INVENTION

Figure 1:
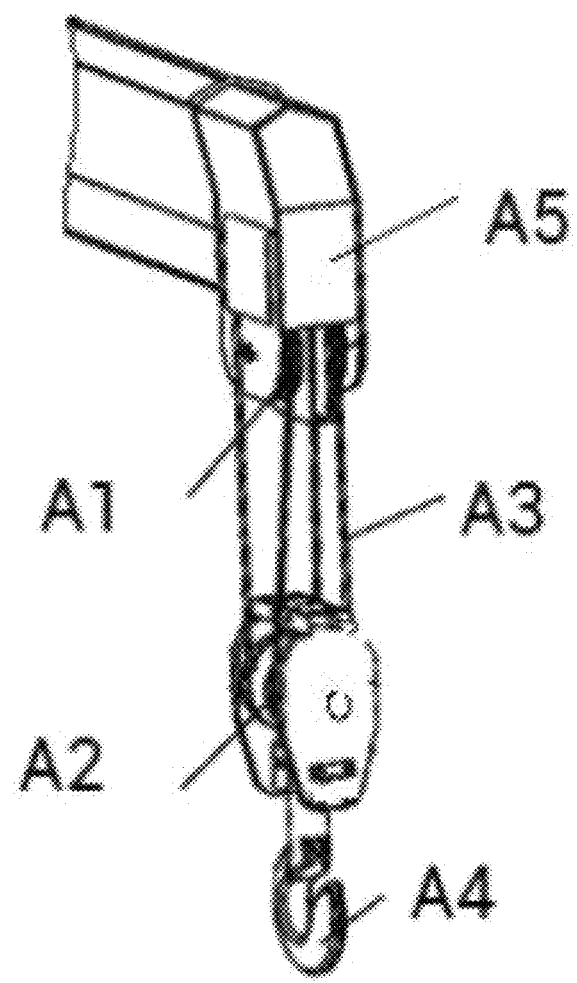
FIG. 1 A schematic diagram of the structure of a pulley block
Figure 2:
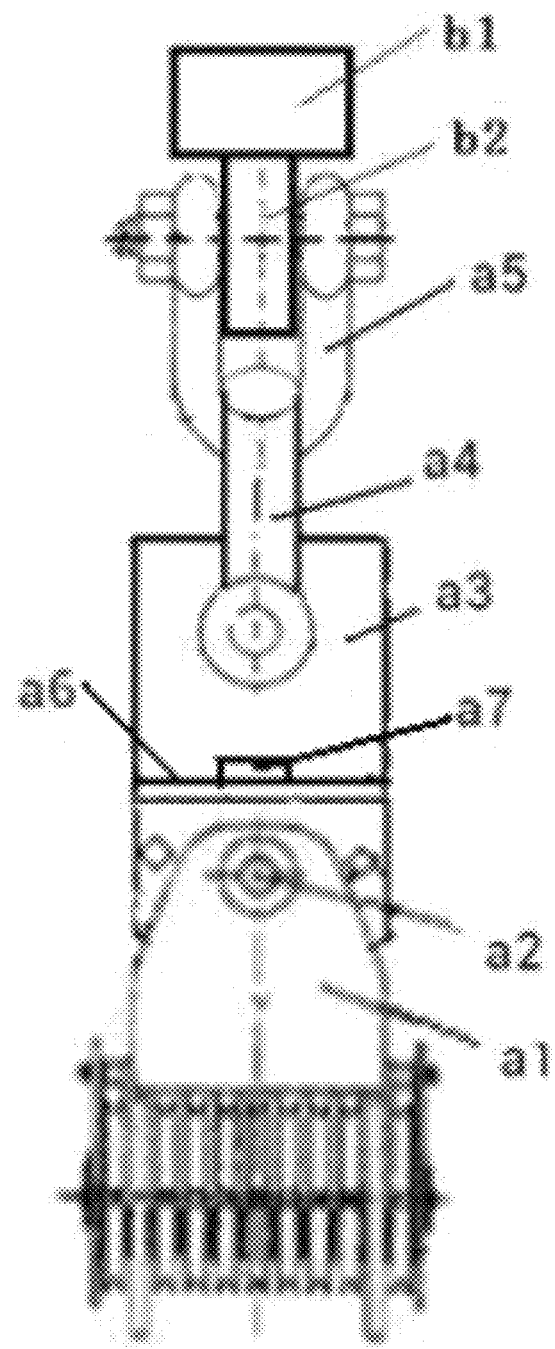
FIG. 2 shows an explanatory diagram of the bias angle of the hook The numbers in FIG. 2: a1 fixed pulley assembly a2 articulated shaft a3 connector a4 shackle 1 a5 shackle 2 a6 platform surface a7 angle measuring instrument FIG. 3 Schematic diagram of the lifting lugs of the crane boom The label in FIG. 3: b1 boom b2 lifting lug
Figure 3:
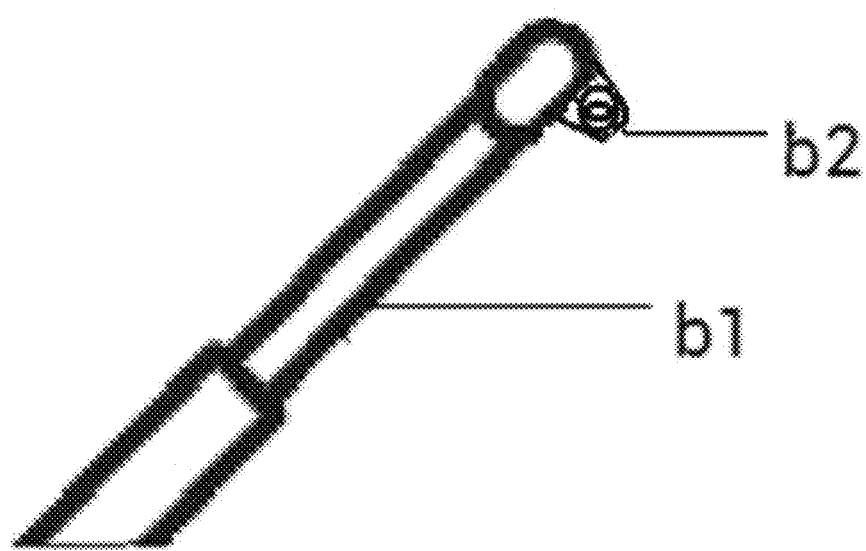
Figure 4:
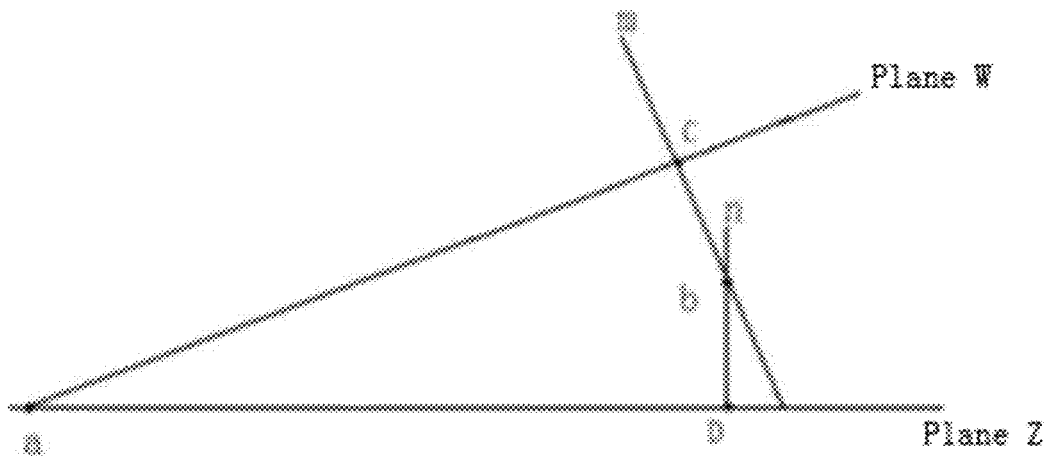
FIG. 4 is an explanatory diagram of detecting the bias angle of the hook from the line of force of the pulley block
Figure 5:
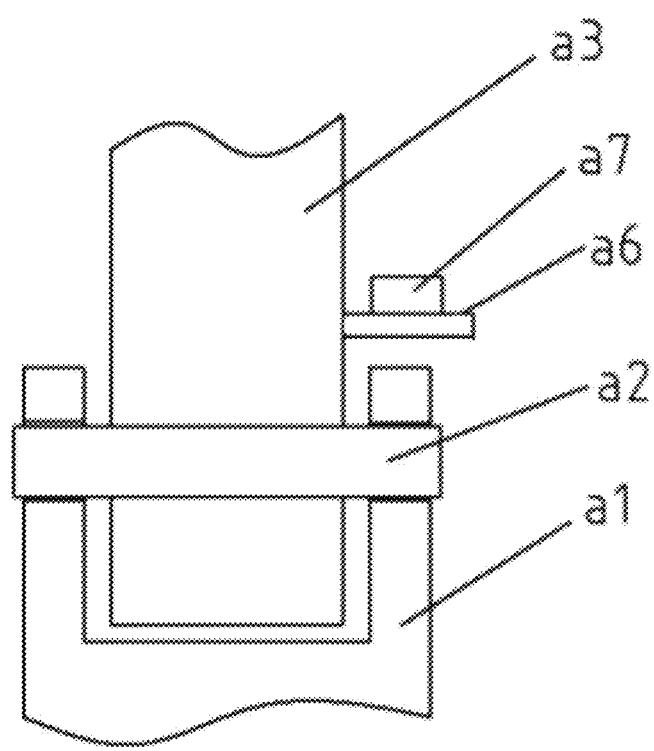
FIG. 5 is a schematic diagram of a left side cross-sectional structure of an embodiment in FIG. 2 detailed description.

FIG. 2, a fixed pulley assembly a1 of a crane is hung on a lifting lug b2 of a crane boom b1 through a connector a3, one end of the connector a3 is connected to the fixed pulley assembly a1 through a articulated shaft a2 which is arranged in a direction perpendicular to the axis of a fixed pulley, and the other end of the connector a3 is hung on the lifting lug b2 of the crane jib through a shackle a5. In this way, when a pulley block force application point on the axis of a fixed pulley deviates, the fixed pulley assembly a1 will be automatically adjusted along the articulated shaft a2 under the effect of hoisting tension of the pulley block, at this moment, the axis of the fixed pulley inclines slightly. Because a pulley block force application line passes through the connector a3, when a platform with a platform surface a6 perpendicular to the pulley block force application line is fixedly installed on the connector a3, the pulley block force application line will be always perpendicular to the platform surface a6 in the hoisting process.

Therefore, the correct detection of the of the hook etc. can be performed through the platform surface a6, because the line of action of the pulley block force is always perpendicular to the platform surface a6 when lifting; it is detected that the angle between the platform surface and the horizontal is equal to the hook bias angle Because the detected real-time hook bias angle is determined by the deviation of the force action line of the pulley block from the vertical line, the basis and rationale are clear, and there is no doubt, and an angle measuring instrument is installed on the platform surface to detect, It belongs to the reliable prior art, so the hook bias angle detection scheme has reliability and feasibility.

Installing an Angle Measuring Instrument to Detect Real-Time Hook Bias Angle

The BWD-VG500 dynamic measurement inclinometer (X, Y axis dynamic accuracy 0.1 degree) of Beiwei Sensing (WWW.bewis.com.cn) is selected and And install it on the defined platform surface a6; the detected real-time X, Y axial components are transmitted via the bus, and the real-time hook bias angle value is equal to the real-time X, Y axial component composite value by the single-chip microcomputer; that a deviation direction of the pulley block force application line from the vertical line is perpendicular to an intersection line of the platform surface a6 and the horizontal plane, and the real-time deviation angle of the pulley block force application line from the vertical line is located on the same plane as the real-time included angle between the platform surface a6 perpendicular to the pulley block force application line and the horizontal plane; and according to the real-time X and Y axial component polarities, the real-time hook bias angle value and orientation are accurately displayed in the crane operating room through the matching display of the prior art.

It should be noted that the above-mentioned embodiments of the present invention are only examples. For those of ordinary skill in the art, press Several changes and modifications made by the present invention should also be regarded as the protection scope of the present invention.

What is claimed is:

1. A monitoring device for displaying real-time hook bias angle, which is characterized in,
a fixed pulley assembly of the crane on the lifting lug of the crane boom hang via a connecting piece with shackles, an articulated shaft used to connect the fixed pulley assembly at the other end of the connecting piece, and the articulated shaft set in an orientation perpendicular the fixed pulley axis;
a platform surface perpendicular to a pulley block force application line or a line parallel to the pulley block force application line is arranged on the connector to be used to detect the deflection posture of the lifting hook;
during hoisting the value of a real-time included angle between the platform surface perpendicular to the pulley block force application line and a horizontal plane or a real-time deviation angle of the line parallel to the pulley block force application line from a vertical line is equal to the value of the real-time bias angle of the lifting hook.

2. The monitoring device for displaying real-time hook bias angle according to claim 1, wherein a real-time included angle between the platform surface a6 perpendicular to the pulley block force application line and the horizontal plane is detected to detect the bias angle of the lifting hook in the hoisting process; and when an angle measuring instrument a7 is installed on the platform surface a6, a real-time X-axis component and a real-time Y-axis component are detected and are then synthesized to obtain the real-time bias angle of the lifting hook.

3. The monitoring device for displaying real-time hook bias angle according to claim 2, wherein a deviation direction of the pulley block force application line from the vertical line is perpendicular to an intersection line of the platform surface a6 and the horizontal plane, and a real-time deviation angle of the pulley block force application line from the vertical line is located on the same plane as the real-time included angle between the platform surface a6 perpendicular to the pulley block force application line and the horizontal plane.

4. The monitoring device for displaying real-time hook bias angle according to claim 2, wherein a fixed pulley assembly a1 of a crane is hung on a lifting lug b2 of a crane boom b1 by a shackle a5 through a connector a3; the connector a3 is connected to the fixed pulley assembly a1 through a articulated shaft a2 which is arranged in a direction perpendicular to the axis of a fixed pulley; a platform surface a6 perpendicular to a pulley block force application line or a line parallel to the pulley block force application line is arranged on the connector a3 to be used to.

5. The monitoring device for displaying real-time hook bias angle according to claim 1, wherein a hoisted object is centered and hoisted according to the displayed real-time bias angle of the lifting hook; and the bias angle of the lifting hook is monitored in the hoisting process according to the displayed real-time bias angle of the lifting hook to ensure that the bias angle is less than a specified value.

6. A mobile crane, which includes:
a monitoring device for displaying real-time hook bias angle, which is characterized in,
Hang the fixed pulley assembly of the crane on the lifting lug of the crane boom via the connecting piece with shackles, Use a articulated shaft to connect the fixed pulley assembly at the other end of the connecting piece, and set the articulated shaft in an orientation perpendicular the fixed pulley axis;
a platform surface perpendicular to a pulley block force application line or a line parallel to the pulley block force application line is arranged on the connector to be used to;
in the hoisting process, the value of a real-time included angle between the platform surface perpendicular to the pulley block force application line and a horizontal plane or a real-time deviation angle of the line parallel to the pulley block force application line from a vertical line is equal to the value of the real-time bias angle of the lifting hook.

7. The mobile crane according to claim 6, wherein:
a real-time included angle between the platform surface a6 perpendicular to the pulley block force application line and the horizontal plane is detected to detect the bias angle of the lifting hook in the hoisting process; and when an angle measuring instrument a7 is installed on the platform surface a6, a real-time X-axis component and a real-time Y-axis component are detected and are then synthesized to obtain the real-time bias angle of the lifting hook.

8. The mobile crane according to claim 7, wherein:
a deviation direction of the pulley block force application line from the vertical line is perpendicular to an intersection line of the platform surface a6 and the horizontal plane, and a real-time deviation angle of the pulley block force application line from the vertical line is located on the same plane as the real-time included angle between the platform surface a6 perpendicular to the pulley block force application line and the horizontal plane.

9. The mobile crane according to claim 8, wherein:
a hoisted object is centered and hoisted according to the displayed real-time bias angle of the lifting hook; and the bias angle of the lifting hook is monitored in the hoisting process according to the displayed real-time bias angle of the lifting hook to ensure that the bias angle is less than a specified value.

* * * * *